United States Patent [19]

Mukai et al.

[11] 4,036,326
[45] July 19, 1977

[54] LUBRICATING OIL PUMP

[75] Inventors: Osamu Mukai; Akira Miyatani, both of Yokohama; Kokichi Fukuzawa, Yamato; Yoshiro Nagao, Chigasaki; Kenichi Kubota, Tokyo; Masakuni Shibuya, Tokyo; Shigelu Kobayashi, Tokyo, all of Japan

[73] Assignee: Mikuni Kogyo Kabushiki Kaisha, Japan

[21] Appl. No.: 600,486

[22] Filed: July 30, 1975

[30] Foreign Application Priority Data

Aug. 2, 1974 Japan .................................. 49-92604

[51] Int. Cl.² ............................................ F16N 13/04
[52] U.S. Cl. ........................... 184/27 R; 123/139 BD; 184/33
[58] Field of Search ................. 184/27 R, 27 A, 27 B, 184/27 C, 27 D, 27 E, 31, 32, 33, 34, 35, 7 D, 7 E, 7 F; 123/139 BD, 139 AC, 139 AR, 139 AD, 139 AE, 139 BC, 139 BE, 196 CP

[56] References Cited

U.S. PATENT DOCUMENTS

| 878,073 | 2/1908 | Lancia | 184/33 |
|---------|--------|--------|--------|
| 2,937,637 | 5/1960 | Heiser | 123/139 BD |
| 3,302,752 | 2/1967 | Shiokawa | 184/6.28 |

FOREIGN PATENT DOCUMENTS 801,667  9/1958  United Kingdom ......... 123/139 BD

Primary Examiner—Richard C. Pinkham
Assistant Examiner—Arnold W. Kramer
Attorney, Agent, or Firm—Cushman, Darby & Cushman

[57] ABSTRACT

A lubricating oil pump comprising a distributor rotatably fitted in a cylinder chamber of a pump body, a plunger fitted to said distributor for the purpose of forming a pump chamber between said distributor and said plunger, said plunger being rotatable integrally with said distributor in rotational direction but being capable of performing relative movement in thrust direction in respect to said distributor, a cam and protuberance formed on one end face of said plunger, and a cam shaft comprising a cylindrical guide-column portion and control cam portion respectively engageable with said cam and protuberance for the purpose of controlling the stroke of said plunger, said lubricating oil pump thereby making it possible to manufacture at a low cost, being capable of maintaining high pumping efficiency and making it possible to control the delivery.

8 Claims, 7 Drawing Figures

# LUBRICATING OIL PUMP

BACKGROUND OF THE INVENTION a. Field of the invention:

The present invention relates to a lubricating oil pump and, more particularly, to a plunger-type lubricating oil pump for which delivery can be arbitrarily set by operation from outside.

b. Description of the prior art:

At present, the following type of plunger pump is proposed and put to practical use as a lubricating oil pump. That is, said plunger pump comprises a first plunger, which rotates and slides in axial direction at the same time and has a hole provided from one end thereof toward the inside thereof, and a second plunger slidably fitted into said hole, said plunger pump performing suction and delivery of liquid such as oil by means of periodical change of the volume of the pump chamber caused by relative movement of the first and second plungers. In the above-mentioned type of lubricating oil pump, however, the first plunger performs rotary motion and sliding motion together with the second plunger and, consequently, sliding motion occurs between the inner surface of the cylinder chamber formed in the pump body and outer surface of the first plunger and between the inner surface of the first plunger and outer surface of the second plunger. Therefore, to prevent wear of these surfaces, it is necessary to pay special attention in selection of material and machining of the pump body and first and second plungers and, consequently, the cost of production becomes high. Moreover, as said plunger pump is so constructed that the first and second plungers perform relative movement by respectively performing both of rotary motion and sliding motion, the effective opening area of the passage for communicating the pump chamber to the suction port or delivery port becomes relatively small and, consequently, the pump as a whole becomes large in size compared with its delivery. Besides, when viscosity of the liquid increases as in the case of low temperature, friction is further increased and the pumping efficiency decreases considerably.

SUMMARY OF THE INVENTION

It is, therefore, a primary object of the present invention to provide a lubricating oil pump of the above-mentioned type arranged to maintain high pumping efficiency by making the sliding area as small as possible.

Another object of the present invention is to provide a plunger-type lubricating oil pump which can be manufactured at a comparatively low cost of production and is suitable for mass production.

Still another object of the present invention is to provide a plunger-type lubricating oil pump for which delivery can be arbitrarily set from outside.

These and other objects of the present invention will become more apparent during the course of the following detailed description and appended claims.

DESCRIPTION OF THE PREFERRED EMBODIMENTS

Figure 1:
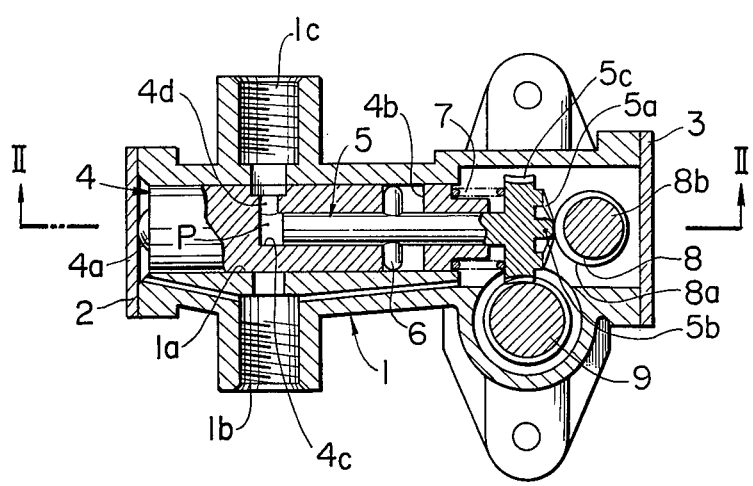
FIG. 1 shows a sectional view of an embodiment of the lubricating oil pump according to the present invention.
Figure 2:
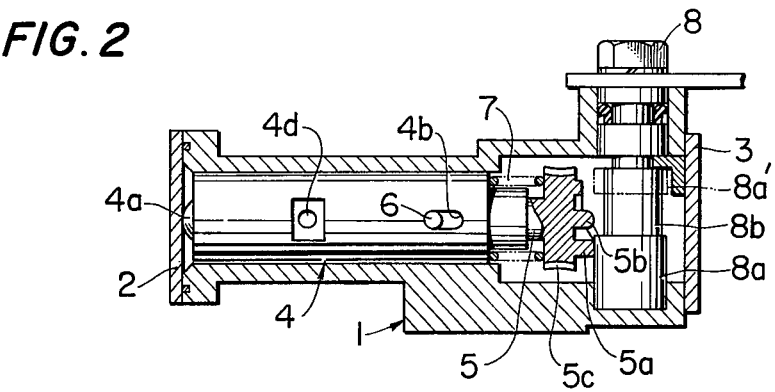
FIG. 2 shows a sectional view taken along the line II—II in FIG. 1.

First referring to FIGS. 1 and 2, reference numeral 1 designates a pump body having a cylinder chamber 1a, suction port 1b and delivery port 1c. Numerals 2 and 3 respectively designate cover members for sealing the openings at both ends of the cylinder chamber 1a. Numeral 4 designates a distributor rotatably fitted in said cylinder chamber 1a. The distributor 4 has a pivot 4a provided at the center of one end face thereof and pivotably supported by the cover member 2, a slot 4b provided radially, a blind hole 4c provided along the center line thereof, and a passage 4d provided at the bottom of said blind hole 4c and communicatable with the suction port 1b and delivery port 1c. Numeral 5 designates a plunger slidably fitted in the blind hole 4c. The plunger 5 has a ridge-shaped cam 5a provided along the circumference of its end face on the outer side and a protuberance 5b provided at the center of said end face. A pump chamber P is formed by means of and between said distributor 4 and plunger 5. Numeral 6 designates a pin driven into the plunger 5 through the slot 4b in radial direction of the plunger 5 and extending through the plunger 5 for the purpose of connecting the distributor 4 and plunger 5 so that they are integrally rotated in rotational direction and that only the plunger 5 slides in axial direction. Numeral 7 designates a coil spring connected between the distributor 4 and plunger 5 and arranged to plunger 5 so that it is spaced from the distributor 4 (to push the plunger 5 rightward in FIG. 1) and to push the distributor 4 against the cover member 2 through the pivot 4a. Numeral 8 designates a cam shaft rotatably supported by the pump body 1 and having a cylindrical guide-column portion 8a engaging with the end face cam 5a and an eccentric control cam portion 8b engaging with the protuberance 5b and limiting the stroke of the plunger 5. Numeral 9 designates a worm rotatably supported by the pump body 1 and intermeshing with a worm gear portion 5c formed on the plunger 5 for the purpose of transmitting the turning force to the plunger 5.

Figure 3:
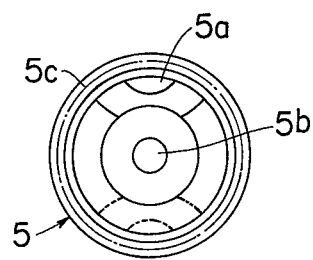
FIG. 3 shows a somewhat enlarged front view of an end face cam.

Operation of the above-mentioned pump is as described below. FIG. 1 and FIG. 2 respectively show the state of the pump when the delivery stroke is completed. When the plunger 5 is rotated through the worm 9 from this state, the ridge-shaped end face cam 5a rotates by contacting the left side surface (as seen in the figure) of the cylindrical guide-column portion 8a and, at the same time, the distributor 4 having the passage 4d also rotates. Therefore, when the pump is manufactured so that the peak of the end face cam 5a is disengaged from the side surface of the cylindrical guide-column portion 8a at the time when the passage 4d begins to communicate with the suction port 1b, the plunger 5 is moved rightward from this state by means of the coil spring 7, the volume of the pump chamber P gradually increases and liquid such as oil is sucked into the pump chamber P from the suction port 1b through the passage 4d. The amount of liquid to be sucked into the pump chamber P is in proportion to the stroke of the plunger 5. Though the maximum stroke of the plunger 5 is equal to the height of the ridge-shaped end face cam 5a, the stroke can be changed within the range up to the maximum stroke by changing the position where the protuberance 5b contacts the eccentric control cam portion 8b. The suction stroke of the pump is as described in the above. Until the end of this suction stroke, the distributor 4 and plunger 5 are rotated just 180°. Therefore, the delivery stroke is carried out by the later 180° rotation of the distributor 4 and plunger 5. That is, when the latter half of rotation begins, the passage 4d, which has been at the intermediate position between the suction port 1b and delivery port 1c, begins to communicate with the delivery port 1c. At the same time, the plunger 5 moves leftward by compressing the coil spring 7. Therefore, the volume of the pump chamber P gradually decreases, liquid such as oil is delivered from the pump chamber P to the delivery port 1c through the passage 4d. Thus, the pump returns to the state shown in FIG. 1 and one suction and delivery operation is completed. In the above embodiment, one suction and delivery operation is carried out every time when the distributor 4 and plunger 5 complete one rotation. When, however, two ridge-shaped end face cams 5a are provided as shown by solid lines and chain lines in FIG. 3 or when another cylindrical guide-column portion 8a' is provided to the cam shaft 8 in addition to the cylindrical guide-column portion 8a as shown by a chain line in FIG. 2, the suction and delivery operation can be carried out twice within one rotation of the distributor 4 and plunger 5.

Figure 4:
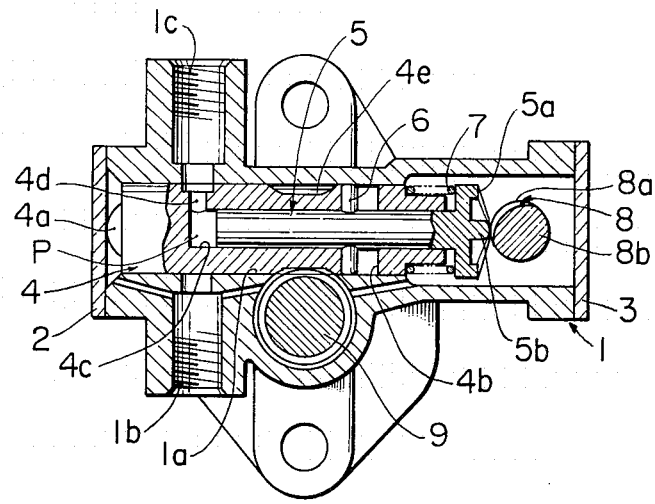
FIG. 4 shows a sectional view of another embodiment of the present invention which is slightly different from the embodiment shown in FIG. 1.

FIG. 4 shows another embodiment of the present invention which is slightly different from the embodiment shown in FIG. 1. This embodiment is different from the embodiment shown in FIG. 1 in the point that a worm gear portion 4e is formed on the distributor 4 and the turning force from outside is transmitted to the distributor 4 by intermeshing said worm gear portion 4e with the worm 9. Therefore, parts and portions similar to those shown in FIG. 1 are designated by the same reference numerals and symbol, and detailed description of them are omitted here.

Figure 5:
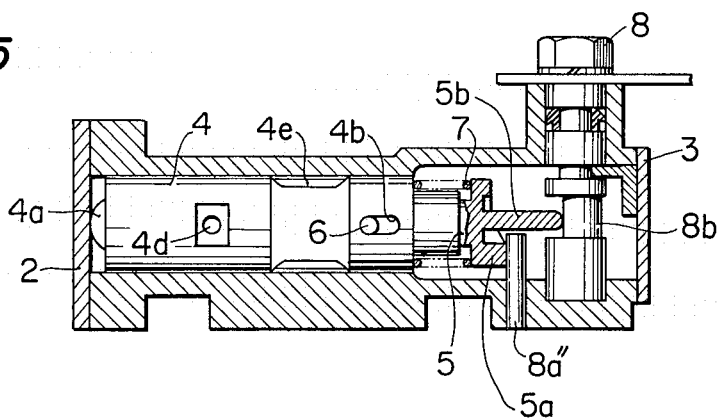
FIG. 5 shows a sectional view similar to FIG. 2 but showing still another embodiment of the lubricating oil pump according to the present invention.

In the above-mentioned respective embodiments, the cylindrical guide-column portion 8a and eccentric control cam portion 8b are formed coaxially. These portions, however, may be formed as separate members on different axes and mounted to the pump body 1 as shown in FIG. 5. That is, in another embodiment shown in FIG. 5, a guide pin 8a" fixed to the pump body 1 is used, instead of the cylindrical guide-column portion 8a clearly shown in FIG. 2, in order to attain the reciprocating movement of the plunger 5. Therefore, the cam shaft 8 serves only for limiting the stroke of the plunger 5.

As it is evident from the above explanation, in the lubricating oil pump according to the present invention, the distributor 4 performs rotation only and the volume of the pump chamber P is increased and decreased only by sliding motion of the plunger 5. Therefore, compared with the known type of lubricating oil pump in which both of the first plunger and second plunger are rotated and slided, the sliding area is similar. Consequently, it is possible to reduce the number of parts which should be made of such material having high wear resistance for which the price is high. Moreover, it is possible to reduce the number of parts which should be machined to high accuracy and, consequently, it is possible to reduce the cost of production of the pump as a whole. Besides, compared with said known type of lubricating oil pump, both of the time for which the passabe 4d is kept communicated with the suction port 1b and the time for which the passage 4d is kept communicated with the delivery port 1c become relatively long and, consequently, it is possible to increase the pumping efficiency.

Figure 6:
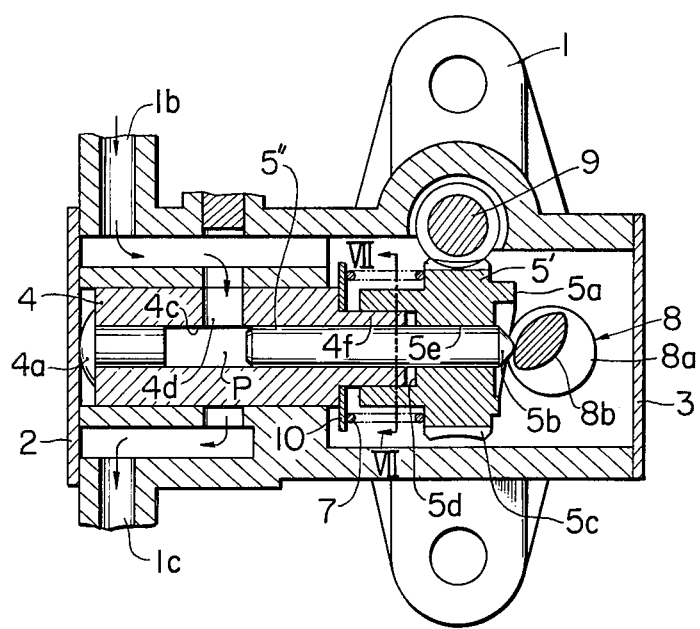
FIG. 6 shows a sectional view similar to FIG. 1 but showing still another embodiment of the lubricating oil pump according to the present invention.
Figure 7:
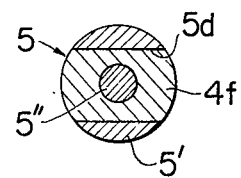
FIG. 7 shows a sectional view taken along the line VII-VII in FIG. 6.

A still embodiment is shown in FIG. 6. The embodiment shown in FIG. 6 differs from the embodiment shown in FIG. 1 in the following points. That is, in the embodiment shown in FIG. 6, the plunger 5 comprises a worm wheel portion 5' on which the end face cam 5a and worm gear teeth 5c are formed, and a shaft portion 5" which is manufactured separately from the worm wheel portion 5' and integrally fixed to said worm wheel portion 5' by means of force-fitting or the like and which has one end portion serving as the protuberance 5b and the other end slidably fitted into the blind hole 4c. Besides, one of the distributor 4 and worm wheel portion 5' has a spigot portion and the other has a socket portion, rotation of the plunger 5 being transmitted to the distributor 4 by fitting said spigot portion into said socket portion. In FIG. 6, reference numerals and symbol same as those given in FIG. 1 are given to those parts and portions of the embodiment shown in FIG. 6 which are similar to those shown in FIG. 1. Construction of the embodiment shown in FIG. 6 is briefly described below. One end of the distributor 4 is formed as a spigot portion 4f having a section as shown in FIG. 7. At the end of the worm wheel portion 5' which is opposite to the end face thereof where the end face cam 5a is formed, a socket portion 5d is formed. Said socket portion 5d is slidably fitted to said spigot portion 4f and has a depth larger than the stroke of the plunger 5, i.e, the amount of axial movement of the worm wheel portion 5'. The shaft portion 5" of the plunger 5 is manufactured separately from the worm wheel portion 5' and is integrally fitted to the worm wheel portion 5' by force-fitting the shaft portion 5" into the through hole 5e at the center of the worm wheel portion 5'. In this case, one end of the shaft portion 5" is projected so that it will serve in the same way as the protuberance 5b at the center of the plunger 5 shown in FIG. 1. Numeral 10 designates a plate fitted to the spigot portion 4f.

This embodiment is so arranged to manufacture the worm wheel portion 5' and shaft portion 5" of the plunger 5 as separate parts. Therefore, it is possible to save the material compared with the plunger 5 shown in FIG. 1. Moreover, it is so arranged to transmit rotation of the worm wheel portion 5' to the distributor 4 only by fitting the socket portion and spigot portion, which are formed on these parts, to each other. Therefore, it is not necessary to machine the slot which is required in the embodiment shown in FIG. 1 and the assembling work is more simplified. Thus, the cost of production of the lubricating oil pump as a whole can be further reduced. Moreover, in case of this embodiment, it is possible to assemble so that the relative position of the passage 4d provided to the distributor 4 and end face cam 5a becomes always correct provided that the center line of the spigot portion 4f, i.e., of the socket portion 5d does not coincide with the center line of the shaft portion 5" as shown in FIG. 6.

We claim:

1. A lubricating oil pump comprising a pump body having a cylinder chamber, suction port and at least one delivery port, a distributor rotatably fitted in said cylinder chamber and having a blind hole in the inside thereof, a plunger slidably fitted in said blind hole and having a cam on the outer end face thereof, said plunger being rotated in rotational direction integrally with said distributor about their common axis but being capable of performing relative movement in thrust direction in respect to said distributor, a cylindrical guide-column member provided to said pump body and engageable with said cam, said cylindrical guide-column member thus making said plunger perform reciprocating movement in thrust direction with respect to said distributor when said plunger is rotated, a spring applied between said distributor and plunger and biasing said plunger so that said cam is pushed against said cylindrical guide-column member, and said distributor is pushed against said pump body to prevent relative movement in thrust direction between said distributor and pump body, a pump chamber formed in said blind hole and between said distributor and plunger and communicatable with said suction port and delivery port and drive gearing within said pump cooperating with gearing on one of said plunger or distributor to rotate said plunger and distributor.

2. A lubricating oil pump according to claim 1 further comprising a protuberance provided at the center of the outer end face of said plunger and a control cam formed integrally with said cylindrical guide-column member and engageable with said protuberance, the stroke of said plunger being varied by rotating said cylindrical guide-column member.

3. A lubricating oil pump according to claim 2, in which said distributor and plunger are coupled with each other by means of pin-slot connection.

4. A lubricating oil pump according to claim 1, in which said cylindrical guide-column member is formed as a pin fixed to said pump body, said pump further comprising a protuberance provided at the center of the outer end face of said plunger, and a control cam rotatably supported by said pump body and engageable with said protuberance, the stroke of said plunger being varied by rotating said control cam.

5. A lubricating oil pump according to claim 1, in which said cam has a ridge-shaped cam surface formed along the circumference of the end face of said plunger.

6. A lubricating oil pump according to claim 1, in which said plunger comprises a large-diameter portion comprising said cam, and a shaft portion integrally fitted to said large-diameter portion by force-fitting said shaft portion to the center portion of said large-diameter portion.

7. A lubricating oil pump according to claim 6, in which a spigot portion is formed on one of said large-diameter portion and said distributor and a socket portion slidably fittable to said spigot portion is formed on the other of them, said distributor and said plunger being coupled with each other by fitting said spigot portion and socket portion to each other.

8. A lubricating oil pump according to claim 7, in which said spigot portion and socket portion are formed eccentric from the center line in common to said distributor and plunger, said pump further comprises a control cam formed integrally with said cylindrical guide-column member, one end portion of said shaft portion is engageable with said control cam, and the stroke of said plunger is varied by rotating said cylindrical guide-column portion.

* * * * *